May 13, 1952     C. J. COSTNER     2,596,762
DYNAMIC FLYER BALANCING APPARATUS
Filed Dec. 13, 1950     2 SHEETS—SHEET 1
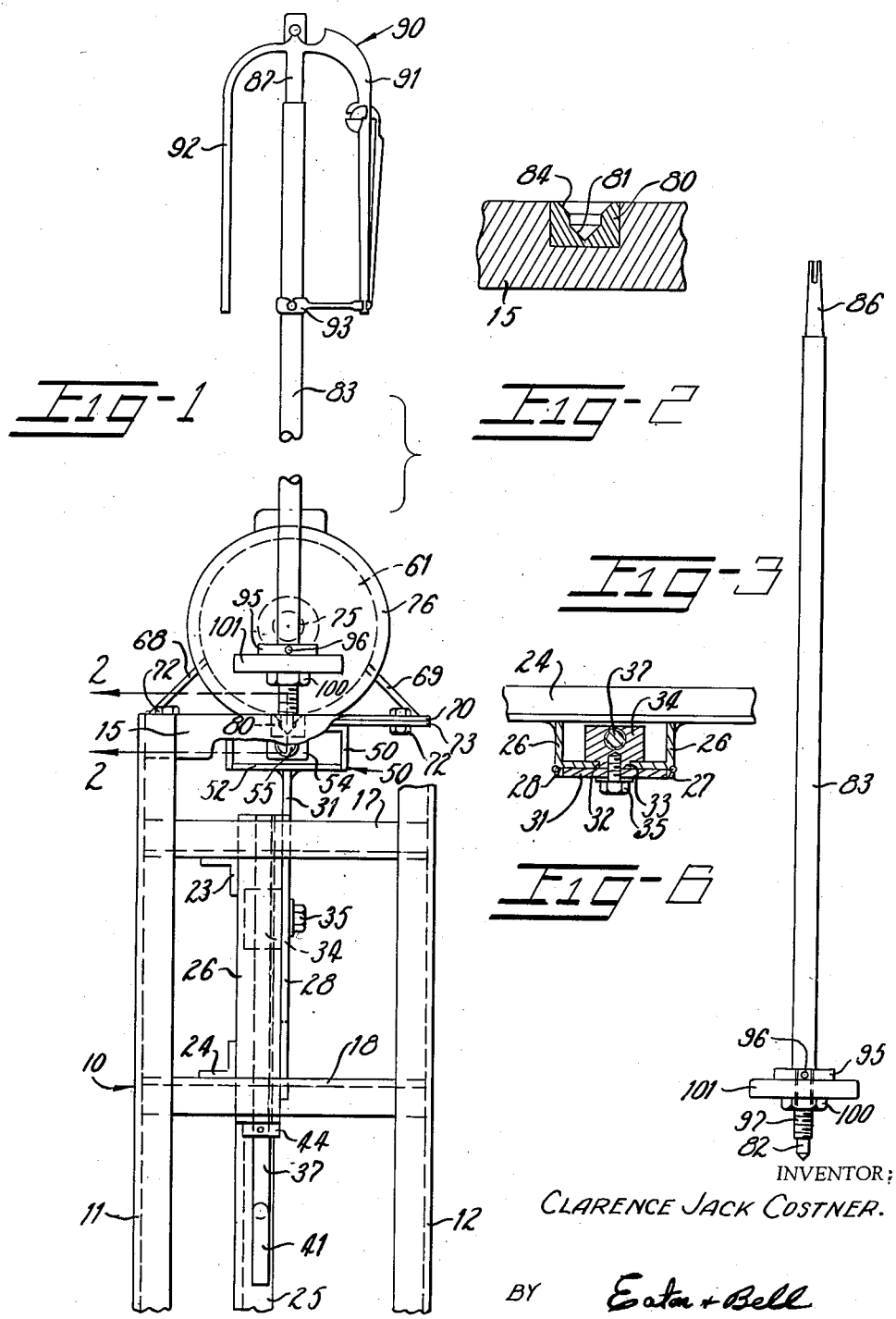
INVENTOR:
CLARENCE JACK COSTNER.
BY Eaton + Bell
ATTORNEYS

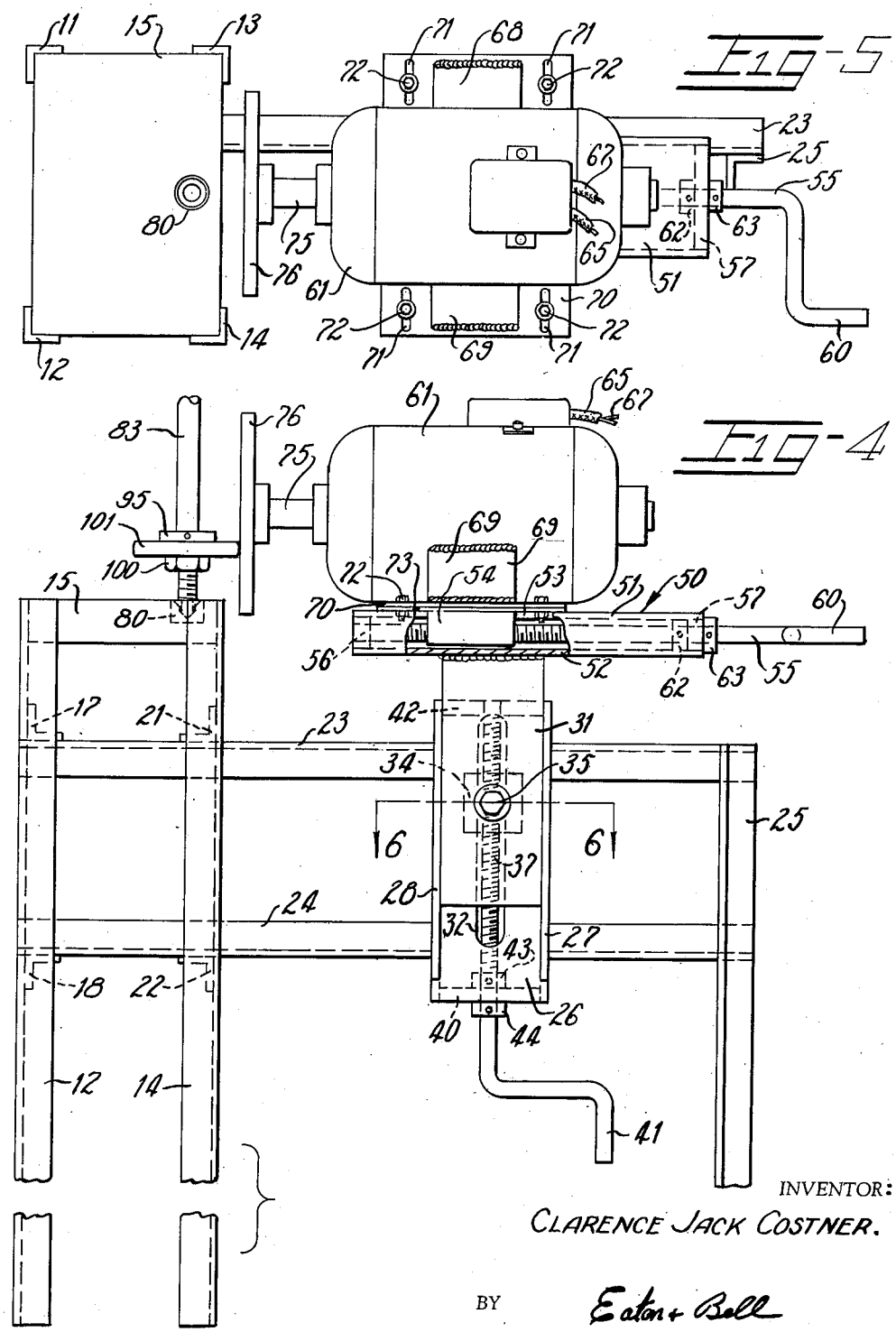

Patented May 13, 1952

2,596,762

UNITED STATES PATENT OFFICE 2,596,762

DYNAMIC FLYER BALANCING APPARATUS

Clarence Jack Costner, Bessemer City, N. C., assignor to Ideal Machine Shops Inc., Bessemer City, N. C., a corporation of North Carolina Application December 13, 1950, Serial No. 200,605

4 Claims. (Cl. 74—194)

This invention relates to textile machinery and more especially to an apparatus for use in balancing flyers on spindles of a roving machine or the like in order to minimize vibration of the spindles which may be transmitted thereto by flyers which are not properly balanced in accordance with a predetermined number of revolutions per minute of the spindles.

It is well known to those familiar with the art that the arms which depend from the flyer on each of the spindles of a roving frame or the like may be bent inwardly or outwardly relative to the spindle as the case demands so that a minimum amount of vibration will be transmitted to the spindle by the flyer during rotation thereof at a predetermined speed. Heretofore, in order to balance the flyers in the manner described, it has been necessary to support the spindles in any desired manner and after placing a flyer on the upper end of the spindle, the spindle would be rotated between the palms of an operator to cause the flyer to rotate at substantially the desired speed and then the spindle shaft would be encircled by the hand of an operator to determine whether the spindle vibrated excessively. Then, through trial and error, the operator would repeat the operation, bending the depending arms of the flyer inwardly and outwardly with respect to the spindle, until a minimum amount of vibration was transmitted to the spindle from the flyer. It is evident however, that it is nearly impossible to rotate a spindle in this manner to cause the same to rotate at the desired number of revolutions per minute with the result that the flyers which appeared to be balanced would cause excessive vibration of the spindles when placed in operation at the desired speed.

The speed of the spindles is varied from time to time depending upon the amount of twist desired and it is necessary to balance the flyers at the same predetermined spindle speed as will be used in actual operation. It is therefore an object of this invention to provide a dynamic flyer balancing apparatus including means for supporting the lower end of a spindle and means for imparting rotation to the spindle at variable rates of speed according to the desired speed at which the spindle will rotate when installed on the roving frame whereby rotation may be imparted to the spindle at the desired speed and an operator's hand may be placed about a medial portion of the spindle in closely spaced relation thereto to support the spindle as rotation is transmitted thereto and to feel any vibration of the spindle with the result that the operator may adjust the depending arms of the flyer on the upper end of the spindle until vibration is reduced to the minimum in accordance with the desired rate of speed.

More specifically it is an object of this invention to provide a table having a nest or cavity therein which is adapted to rotatably support the lower end of a spindle and to further provide a vertically and horizontally adjustable driven disk having a horizontal axis and to provide an annular adaptor surrounding the lower portion of the spindle and adapted to be engaged by the rotatable disk for transmitting rotation to the vertically disposed spindle. Thus, the spindle from a roving frame may be placed in the nest provided therefor after placing one of the adaptors thereon and by adjusting the rotating disk, the desired revolutions per minute may be transmitted to the vertically disposed spindle and the spindle may be loosely held intermediate its ends by an operator to determine the vibration thereof when a flyer is placed on the upper end of the spindle.

Some of the objects of the invention having been stated, other objects will appear as the description proceeds when taken in connection with the accompanying drawings in which—

Figure 1 is a front elevation of the dynamic flyer and spindle balancer;

Figure 2 is an enlarged fragmentary vertical sectional view taken substantially along the line 2—2 in Figure 1 and showing the nest for supporting the lower end of the spindle for rotation and omitting the spindle;

Figure 3 is an elevation of a spindle of a roving frame disassociated from the dynamic balancer and showing the adaptor mounted thereon but omitting the flyer from the upper end thereof;

Figure 4 is an elevation with parts broken away looking at the right hand side of Figure 1 but omitting the upper portion of the spindle;

Figure 5 is a top plan view looking down at the top of Figure 4 but omitting the spindle and the associated adaptor therefrom;

Figure 6 is a sectional plan view taken substantially along the line 6—6 in Figure 4.

Referring more specifically to the drawings, the numeral 10 broadly designates a table or frame including corner post legs 11, 12, 13 and 14 in the form of angle bars which support a table top or platform 15 suitably secured thereto as by welding.

The front legs 11 and 12 of the frame 10 are bridged intermediate their ends by vertically spaced horizontally disposed frame members in the form of angle bars 17 and 18. The rear legs 13 and 14 are bridged intermediate their ends by vertically spaced horizontally disposed frame members in the form of angle bars 21 and 22, the angle bars 17 and 18 and 21 and 22 being suitably secured to the corresponding legs 11, 12, 13 and 14 by any suitable means such as welding.

Respective upper and lower horizontally disposed motor carriage frame members in the form of angle bars 23 and 24 are welded to the horizontally disposed frame members 17 and 21 and 18 and 22 intermediate the ends thereof. These frame members 23 and 24 extend rearwardly substantially beyond the rear legs 13 and 14 of the frame 10 and are suitably secured as by welding, to a fifth leg 25 for supporting the rear end of the frame members 23 and 24. The flanges of a vertically disposed channel bar 26 are welded intermediate the ends of the horizontally disposed frame members 23 and 24. This channel bar 26 has a pair of vertically disposed horizontally spaced guide members 27 and 28 suitably secured adjacent the opposed edges of the web thereof, as by welding and between which a vertically adjustable carriage support plate 31 has vertical sliding movement.

The web of the channel bar 27 has a vertically extending slot 32 therein which is slidably penetrated by a reduced portion or projection 33 (Figure 6) of a threaded block or trunnion 34, the plate 31 being secured to the outer surface of the projection of the reduced portion 33 in the block 34 by any suitable means such as a screw 35.

It will be observed in Figure 6 that the block 34 has a vertically extending threaded bore 36 therein which is threadably penetrated by a vertically disposed threaded adjustment shaft 37 which extends downwardly and is mounted for rotation in a bearing block 40 suitably secured at opposed ends thereof, as by welding, to opposed flanges of the channel bar 27 at the lower end thereof. The threaded adjustment shaft 37 extends downwardly beyond the bearing block 40 and has a hand crank or handle portion 41 integral therewith which is adapted to be manipulated by an operator for vertical adjustment of the plate 31.

It will be noted that there is also provided a bearing block 42 which is identical to the bearing block 40 but which spans the distance between the flanges of the channel bar 26 at the upper end thereof to assist in supporting the threaded shaft 37.

In order to insure that the threaded shaft 37 will remain in the same vertical position upon manipulation of the handle 41 by an operator to thus impart vertical movement to the plate 31, there is provided a pair of thrust collars 43 and 44 which are fixedly mounted on the lower portion of the threaded shaft 37 and which slidably and rotatably engage the opposed or respective upper and lower surfaces of the bearing block 40.

The motor carriage support plate 31 supports a motor carriage broadly designated at 50 and which is constructed in a similar manner to the parts for adjustably supporting the plate 31. The motor carriage 50 comprises a substantially horizontally disposed channel bar 51, the down turned flanges of which have welded therebetween a plate 52 which is welded to the upper end of the vertically disposed plate 31. The web of the channel bar 51 has a longitudinally extending slot 53 therein in which a motor support block 54 is mounted for horizontal sliding movement.

The motor support block 54 is threadably penetrated by a threaded motor adjustment shaft 55 which is mounted for rotation in bearing blocks 56 and 57, respectively, secured at opposed ends of the channel bar 51 between the flanges thereof.

The threaded adjustment shaft 55 extends substantially beyond the right-hand or rear-end of the channel bar 51 and has a handle or hand crank portion 60 integral therewith which is adapted to be manipulated by an operator for the purpose of adjusting an electric motor 61 longitudinally of the motor carriage 50. In order to insure that the shaft 55 will remain in a constant position relative to the channel bar 51 upon manipulation of the crank 60 by an operator, a pair of collars 62 and 63 are suitably secured to the shank of the threaded shaft 55 and slidably and rotatably engaged opposed surfaces of the block 57.

The electric motor 61 has wires 65 and 67 extending therefrom and which are adapted to be connected to a suitable source of electrical energy, not shown, for energizing the electric motor 61. The electric motor is secured to the motor support block 54 by any suitable means such as angularly disposed plates 68 and 69 which are welded at their upper ends to the motor 61 and extend downwardly and outwardly in diverging relation to each other and are welded at their lower ends to a motor support plate 70 having a plurality of transversely extending adjustment slots 71 therein each of which is penetrated by a bolt 72 for securing the motor support plate 70 to an auxiliary motor support plate 73. The auxiliary motor support plate 73 is mounted for horizontal sliding movement on the upper surface of the channel bar 51 and the block 54, heretofore described, is welded to the lower surface of the plate 73 substantially in the center thereof.

It is thus seen that the motor 61 may be adjusted transversely of its axis by means of the bolts 72 working in the slots 71 of the plate 70 and it may be adjusted longitudinally of its axis by manipulation of the handle 60 by an operator which will transmit movement to the block 54 and thus to the plate 73 since the block 54 is mounted for longitudinal sliding movement in the slot 53 and may also be adjusted vertically by means of the handle 41 and associated parts. The electric motor has a motor shaft 75 extending therefrom on the outer end of which a friction wheel 76 is fixedly mounted, this friction wheel 76 preferably being of metallic construction.

Now, referring to Figure 4, it will be observed that the table top or platform 15 has a nest block 80, preferably of hardened steel, suitably secured therein as by a pressed fit. This nest block 80 has a substantially conically-shaped cavity 81 therein which is adapted to receive the conically-shaped lower end portion 82 of a roving spindle 83. The illustrated roving spindle 83 is of a type which is usually associated with a roving frame manufactured by various textile machinery manufacturers and is conventional. In order that the conically-shaped lower end 82 of the spindle 83 may be easily inserted in the cavity 81, the wall of the cavity 81 adjacent the upper edge thereof is slanted or champhered as at 84 to thus lead the portion 82 of the spindle 83 into the conically-shaped cavity 81 of the nest block 80.

Now, as heretofore stated, the spindle 83 is of conventional construction and has a reduced tapered upper end portion 86 which is adapted to receive a mating tapered tubular portion 87 of a conventional flyer broadly designated at 90. This flyer 90 is of the usual well known construction and includes a pair of diametrically opposed downwardly extending arms 91 and 92. The arm 91 is of hollow construction and is employed in directing yarn not shown to a conventional presser foot 93 which is oscillatably supported on the arm 91. The arm 92 may be termed a balancing arm since this arm 92 is provided to counter-balance the weight of the arm 91 and its associated presser foot 93.

In order that rotation may be transmitted to the spindle 83 upon the lower end 82 of the spindle 83 being placed in the conically-shaped cavity 81 of the nest block 80, there is provided an annular adaptor plate 95 which is suitably secured, as by a set screw 96, on a lower reduced portion 97 being disposed immediately above the conically-shaped portion 82 of the spindle 83. This reduced portion 97 of the spindle 83 may be threaded for reception of a nut 100 which is provided to secure a resilient disk 101 on the portion 97 of the spindle 83 against the adaptor plate 95. If desired, the adaptor 95 and the nut 100 may be secured on the reduced portion 97 of the spindle 82 as by a pressed fit to obviate the necessity of the reduced portion 97 being threaded.

As is well known to those familiar with the art, flyers such as the flyer 90 on roving frames and the like must rotate at varying speeds in accordance with the desired twist in the yarn being directed thereby to the bottom of the roving frames and it has been found that in order to minimize vibration of the spindles on which the flyers are mounted and, of course, to minimize vibration of the flyers, it is necessary that the flyers, such as the flyer 90, be balanced on the spindles such as the spindle 83, in accordance with the particular speed at which the flyers will be operated while in use on the roving frame.

Therefore, in balancing flyers according to the invention, the flyers 90 are individually mounted on the upper end of the spindle 83 as it is modified according to the illustration of Figure 3, and an operator grasps the spindle 83 intermediate its upper and lower ends and places the lower end 82 thereof in the nest block 80. The motor is then adjusted horizontally in the manner heretofore described to cause the friction disk 76 to engage the resilient disk 100 to thus impart rotation to the spindle 83. The operator may then use a suitable tachometer for determining the revolution per minute of the flyer 90 on the spindle 83.

In order to attain the desired speed of rotation the operator may support the spindle 83 with his hand loosely encircling the medial portion of the spindle 83 and, the motor 61 may then be adjusted vertically in a manner heretofore described, that is, by manipulation of the handle 41, thus varying the distance between the axis of the disk 76 and the point at which the disk 76 is engaged by the resilient disk 101 on the spindle 83. It is evident that the greater the distance between the axis of the disk 76 (Figure 4) and the resilient disk 101, the greater will be the number of revolutions per minute imparted to the spindle 83 from the disk 76.

Upon obtaining desired rates of speed of the spindle 83, vibrations in the spindle 83 can be felt by the operator as his hand encircles the medial portion thereof and the operator may then tilt the spindle 83 to move the resilient disk 101 out of engagement with the friction disk 76 and may then adjust the lower end of the arm 92 of the flyer 90 inwardly or outwardly relative to the spindle 83 to thus vary the tortional effect caused by rotation of the arm 92 of the flyer 90 to reduce vibration of the spindle 83. This operation may be repeated a number of times until the vibration of the spindle 83 is reduced to a minimum to thus insure that the flyer 90 is dynamically balanced for rotation at a predetermined number of revolutions per minute.

In the drawings and specification, there has been set forth a preferred embodiment of the invention and although specific terms are employed, they are used in a generic and descriptive sense only and not for purposes of limitation, the scope of the invention being defined in the claims.

I claim:

1. A dynamic balancer for flyers of roving frame and the like comprising a frame having a nest therein, a vertically disposed spindle having its lower end adapted to be rotatably mounted in said nest and having its other end adapted to rotatably support a flyer, said spindle having a disk thereon, a motor mounted on said frame and having a driven disk thereon mounted for rotation on a substantially horizontal axis, said driven disk being adapted to engage the disk on the spindle for rotating the spindle whereby the flyer thereon may be balanced by an operator, said motor having a motor base plate secured thereto, a second motor base plate to which the first-named motor base plate is adjustably secured, a block secured to said second motor base plate, a track member in which said block is slidably mounted, means for moving said block in said track member for horizontal adjustment of said motor, a second track member secured to said frame and having a second block slidably mounted therein, said second block being secured to said first-named track member and means for moving said second block in said second track member for vertical adjustment of said motor whereby the driven disk on said motor may be engaged at various desired points thereon by the disk on said spindle to vary the speed of rotation transmitted to said spindle.

2. A dynamic balancer for flyers of roving frames and the like comprising a frame having a nest therein, a spindle having one end adapted to be rotatably mounted in said nest and having its other end adapted to rotatably support a flyer, said spindle having a disk thereon, a motor having a driven disk thereon adapted to engage said disk on the spindle, and means for adjusting said motor horizontally and vertically comprising a first trackway secured to said frame and having a first block slidably mounted therein for vertical movement, said first block having a second trackway secured to the upper edge thereof and extending in a horizontal plane, said second trackway having a second block slidably mounted therein, means securing said motor to said second block, and individual means for moving said first and second blocks in the respective first and second trackways to vary the position of the motor to vary the point on the driven disk which is engaged by the disk on the spindle to vary the speed of rotation transmitted to said spindle.

3. An apparatus for balancing a flyer for a roving frame and the like comprising a frame having a nest block thereon, said nest block having a conical cavity in the upper surface thereof, a spindle having a pointed lower end adapted to be rotatably supported in the conical cavity in said nest block and the upper end of said spindle being adapted to support a flyer, said spindle having a resilient disk secured thereto, a motor carriage support plate mounted for vertical adjustment on said frame, a motor carriage supported by said plate, a motor adjustably supported by said carriage and having a driven friction disk thereon, said driven friction disk having a horizontal axis and being disposed adjacent the spindle, means for manually adjusting said motor in a horizontal plane both transversely and longitudinally of said carriage and means for manually adjusting said support plate vertically on said frame to vary the position of said motor to thereby cause said resilient disk on said spindle to be engaged by the driven friction disk at the desired point on the driven friction disk to impart the desired number of revolutions per minute to the spindle.

4. A device for balancing spindles and flyers of roving frames and the like comprising a frame, a spindle support for the lower end of said spindle carried by the frame, a vertically adjustable carriage mounted on said frame adjacent the spindle support, a horizontally movable motor support plate mounted on the carriage, a motor secured to said horizontally movable motor support plate, a driven disk mounted for rotation on a horizontal axis on said motor and an annular adaptor mounted on the spindle and being engaged by said driven disk for imparting rotation to said spindle whereby a flyer may be mounted on the top of the spindle and may be dynamically balanced by an operator.

CLARENCE JACK COSTNER.

REFERENCES CITED

The following references are of record in the file of this patent:

UNITED STATES PATENTS

| Number | Name | Date |
|---|---|---|
| 216,228 | Seymour | June 3, 1879 |
| 1,069,272 | Linder | Aug. 5, 1913 |

FOREIGN PATENTS

| Number | Country | Date |
|---|---|---|
| 278,946 | Italy | Oct. 24, 1930 |